United States Patent [19]

Ingenito et al.

[11] 4,115,714
[45] Sep. 19, 1978

[54] STEPPING MOTOR

[75] Inventors: Michael J. Ingenito, Bronx, N.Y.; Harold J. Hartnett, Norwalk, Conn.

[73] Assignee: General Time Corporation, Thomaston, Conn.

[21] Appl. No.: 663,766

[22] Filed: Mar. 4, 1976

[51] Int. Cl.² ............................................. H02K 37/00
[52] U.S. Cl. ................................... 310/49 R; 310/156; 310/268
[58] Field of Search ............... 310/49, 83, 40 MM, 84, 310/162–164, 165, 157, 156, 268, 254, 258, 259, 190, 194; 58/23 A, 23 D

[56] References Cited

U.S. PATENT DOCUMENTS

| | | | |
|---|---|---|---|
| 2,993,159 | 7/1961 | Devol | 310/268 |
| 3,576,455 | 4/1971 | Ingenito | 310/163 |
| 3,634,743 | 1/1972 | Ingenito | 310/268 |
| 3,673,446 | 6/1972 | Watal | 310/268 |
| 3,745,388 | 7/1973 | Frederick | 310/49 |
| 3,803,433 | 4/1974 | Ingenito | 310/162 |
| 3,860,842 | 1/1975 | Schwab | 310/49 |
| 3,869,627 | 3/1975 | Ingenito | 310/162 |

*Primary Examiner*—R. Skudy

*Attorney, Agent, or Firm*—Pennie & Edmonds

[57] ABSTRACT

A motor is driven in stepped fashion by a pulsed alternating output from an integrated counter circuit and a source of oscillation to drive a gear train of a clock in stepped increments. The motor includes a stator having a core with at least one pair of stator poles, a winding coupled to the core, and a rotor having permanently magnetized poles of alternately opposite polarity; while the oscillator includes a highly stable quartz crystal. The stepping motor is self starting within at least the second pulse applied across the winding and provides a unidirectional drive by provision and arrangement of a pair of extensions, one on each stator pole although on opposite sides, proximate an air gap between stator poles, within which the rotor rotates. One extension is disposed forwardly into the air gap, while the other extension is disposed rearwardly out of the air gap. The extensions cause the rotor to reside in a magnetic detent disposition relative to the stator arrangement when no current flows in the stator winding and the stepped or skewed disposition of the extensions at the air gap influences the rotor to move unidirectionally through stepped increments upon each energization of the winding.

13 Claims, 12 Drawing Figures

FIG. 1.
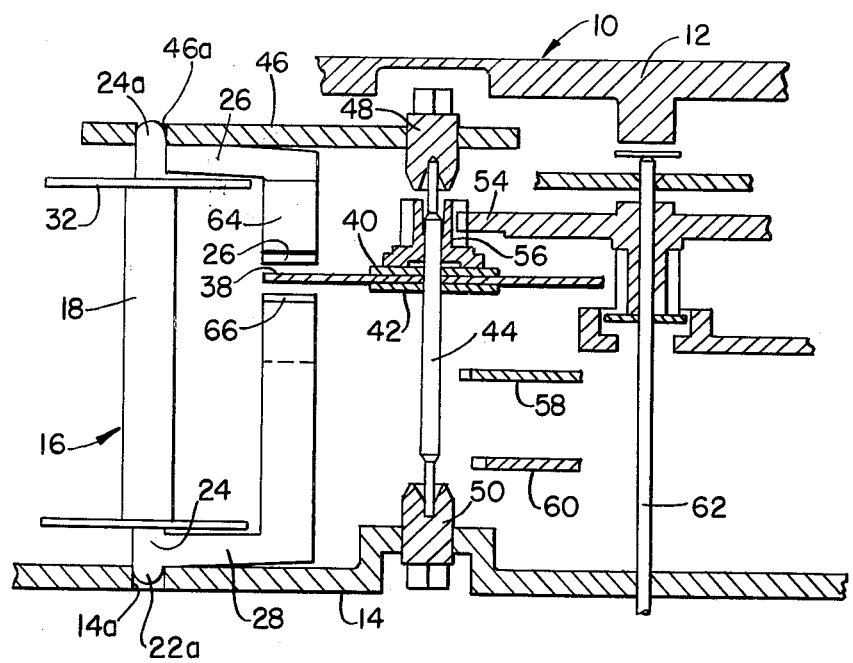
FIG. 2.
FIG. 2A.
FIG. 2B.
FIG. 3.
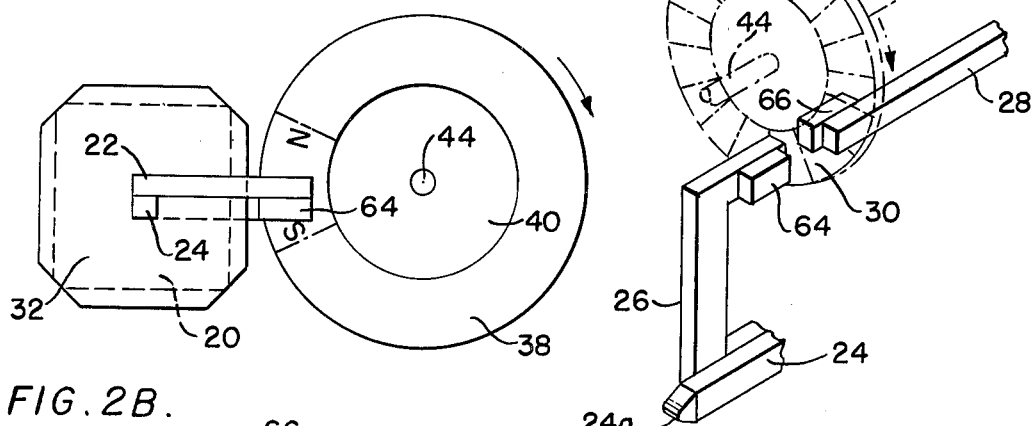
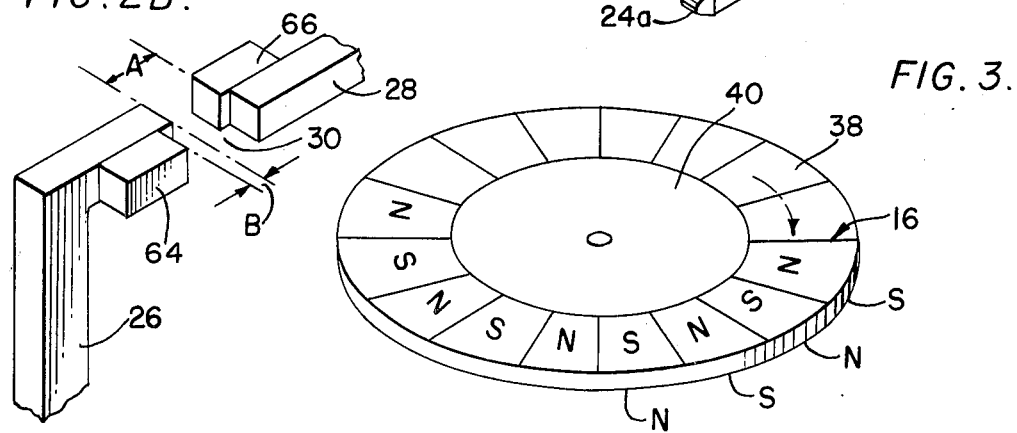

(STOP AT DETENT POSITION)

STEPPING MOTOR

BACKGROUND OF THE INVENTION

Timing motors are well known prime movers in clock applications. These motors are of various types and have been powered both by a direct current source such as a battery, or by an alternating current source which may be the conventional current mains. Although both types of prime mover have been employed with commercial acceptance for a relatively long period of time, the cost of the common A.C. or synchronous motor entails certain manufacturing expense made necessary by the requirement of various mechanical components including levers and springs for starting of the mechanical drive, an escapement mechanism formed by a ratchet and pawl for driving the gear train, as well as structure providing a stop to limit movement of the gear train as well as assuring movement of the clock hands in one direction, only. The latter structure commonly is referred to as a "no-back" mechanism. As should be apparent, such mechanical structures add to the cost of the clock or similar horological device thereby possibly to remove the manufactured item from the purchasing range of some segments of the buying public.

Thus, for these reasons and others, the industry has endeavored to develop a clock or similar horological device not only of lower cost but, preferably, one that ensures self-starting from an integral low power source, is free of the "black-out" type of power failure and, by virtue of the low power source, is free of electrical hazard.

BRIEF DESCRIPTION OF THE INVENTION

The present invention is directed to these ends. Thus, the present invention is directed to a battery movement stepping motor which rotates in synchronism with alternating current pulses derived from a quartz crystal oscillator and an integrated circuit for driving an analog clock or an equivalent device. The stepping motor of the present invention has been found to provide many advantages, among which are precision and accuracy, low cost, low power consumption yielding on the average at least 12-months service with standard battery cells, dependability, and a high torque drive to the timing gear train facilitating the use of larger-sized minute, hour and sweep second hands.

The stepping motor includes a stator having a core with at least a pair of stator poles pieces defining a pole pair and a winding coupled to the core to generate an alternating and pulsating flux field in the core upon each current pulse. The current pulses are precisely controlled and constitute the output of an integrated circuit. The input frequency to the integrated circuit is developed by a highly stable and accurate quartz crystal oscillator achieving an accuracy of ±½ second per day. The output of the integrated circuit is an alternating pulsed output which is applied across the winding. The stepping motor, further, includes a rotor formed by a disc having permanently magnetized poles disposed about an outer annulus. The rotor poles are of alternately opposite polarity with the magnetic fields generated thereby being directed substantially perpendicular to the plane of the disc and parallel to the flux lines induced in the stator by the winding. The magnetized annulus of the rotor passes through an air gap formed between each stator pole pair and coacts with the stator thereby to be driven at a desired rate of movement. In the present invention the speed of movement is relatively slow thereby to obviate a certain amount of gear reduction heretofore required in the many prior art motors. If an output torque greater than that derived by a single stator pole pair is required, the motor may employ additional stator pole pairs.

The stepping motor is both self-starting and unidirectional in drive, an operation achieved primarily by the structure of the stator which maintains a positional relationship between the magnetized rotor and the poles of the stator when no current pulse is applied to the winding. The positional relationship of the magnetized poles of the rotor and the stator is the magnetic detent position of the rotor, a position of angular displacement of the rotor in the air gap. The magnetic detent position of the rotor is a quiescent position of the rotor obtained through incorporation of extensions or projecting members on each stator pole, although on opposite sides, proximate the air gap through which the rotor moves. The positioning prevents "lock-up" of the rotor within the air gap between stator poles and, particular on initial energization, conditions each magnetic pole of the rotor to move out of the air gap through stepped increments within at least the time period required for occurrence of the second pulse of opposite polarity to be applied across the stator winding. The stepped or skewed disposition of the extensions or projecting members at the air gap influences the rotor in the direction of the smaller air gap when no current flows in the winding. When current flows in the winding, the stator field reacts with the rotor field to repel the magnetic pole by an increment out of the air gap. Each sequential alternating energization of the winding similarly repels the magnetic pole, which repulsion is unidirectionally from the magnetic detent position. The self-starting and incremental unidirectional operation of the stepping motor makes unnecessary the use of various structures employed by prior art motors as heretofore discussed including the levers and springs for starting, the "no-back" mechanism to prevent reverse rotation and the mechanical stops to limit motion of the gear train. The feature of the stepping motor providing a stepping drive also makes unnecessary the escapement structure formed by a ratchet and pawl which are common in the prior art. The stepping motor provides a low speed (about 7.5 rpm) stepping drive of the rotor. Since the drive is unidirectional, and there are no mechanical hindrances, the hands of the clock or other horological device may be set through movement in either direction without fear of the hands thereafter running in the wrong direction and causing mechanical damage.

Other advantages of the present invention will become apparent as the specifics of the stepping motor are developed below and considered together with the consideration of the drawing figures.

DESCRIPTION OF THE DRAWING

FIG. 1 is a view in elevation of the stepping motor of the present invention illustrating generally the movement driven thereby;

FIG. 2 is a top plan view of the stepping motor of FIG. 1;

FIG. 2A is a view in perspective of a portion of the stator of the stepping motor, with the rotor being illustrated in phantom;

FIG. 2B is an enlarged view of a portion of the stator of FIG. 2A at the air gap and without regard to scale illustrates the stepped or skewed disposition of a pair of extensions;

FIG. 3 is a view in perspective of the rotor forming a portion of the stepping motor of FIG. 1;

DETAILED DESCRIPTION OF THE PREFERRED EMBODIMENT

Figure 4A:
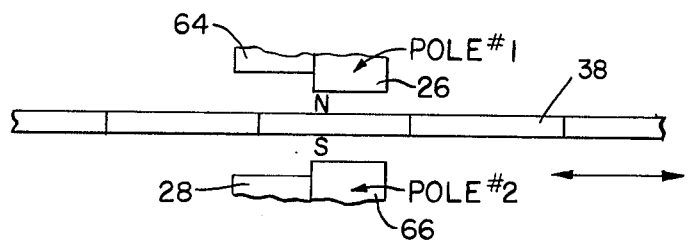
FIGS. 4A-F illustrate sequentially positions that the rotor of FIG. 3 assumes before, during and after a driving pulse is applied to the energizing winding of the stator forming a portion of the stepping motor of FIG. 1.

FIG. 1 illustrates a portion of a casing 10 and structure of the stepping motor of the present invention including a portion of the mechanical gear train which is driven by the stepping motor. The gear train is coupled to for rotating the hands of a clock or similar horological device by well known structure (not shown). An electronics package and a quartz crystal oscillator described below provide an accurate and precise source of input pulses for the stepping motor which is driven through constant set incremental angles of rotation, in a manner also to be described.

The casing includes a top wall 12 (only partially shown), a plurality of side walls (not shown) depending therefrom and a base plate 14 (only partially shown). The base plate may be received on a shoulder formed in the side walls surrounding the opening to a chamber and secured to the casing by any suitable means, such as a pair of screws which are received through the base plate and threaded into a pair of bosses extending from the top wall adjacent to at least two opposite side walls. The structure within the casing preferably may be supported by the base plate so that upon removal from the casing it may be repaired or worked upon as otherwise may be necessary.

The casing may be formed of plastic such as high impact polystyrene and molded to the desired shape as generally discussed. The motor, denoted by the numeral 16, includes generally a stator and a rotor. The stator is formed by a core 18 upon which is wound an energizing winding 20, see FIG. 2. The core supports a pair of legs 22 and 24 which extend at least from one side of the winding to the other. An arm 26 extends from the leg 22 in a direction first generally normal to the core and second in a direction generally parallel to the core. A second arm 28 in a similar fashion extends from the leg 24. Both arms terminate at an air gap 30 whose outline may be seen to best advantage in FIG. 2B. The particular make-up of the stator arrangement will be discussed below. As indicated, a plurality of pairs of pole pieces likewise could be located at the air gap if a larger output torque capability should be required. In this connection the pole pieces of each pole pair would be formed on a core comprised of a base with each pole face on each pole piece disposed in a plane parallel to the base (or upwardly away from the base) and separated one from the other by a notched portion.

The legs within the core 18 are positioned side-by-side to increase the cross-sectional area substantially to a square configuration. As is well known, this configuration provides a very efficient electromagnetic coupling relationship with the winding 20. The legs 22 and 24 may be spot welded adjacent their ends to form a unitary assembly. The arms 26 and 28 throughout their length toward the air gap 30 are of a thickness of the individual legs and of increased thickness at the pole faces on opposite sides of air gap 30. Factors such as the leakage flux at the stator pole faces, the surface area of the rotor pole, the width of the air gap between stator pole pairs, and the unmagnetized transition region between the adjacent magnetic poles of the rotor to name a few determine the optimum thickness of the stator at the pole faces. The legs and arms of the stator may be of annealed iron and, preferably, formed integrally by a stamping process.

A winding bobbin 32 comprised of any suitable material such as a hardened plastic material is supported by the legs 22 and 24. The winding 20 is concentrically wound about the bobbin. The winding is comprised of a number of turns and, preferably, is formed of copper wire. The number of turns of the winding and the gauge of the wire are dictated by various factors, such as the total resistance desired, the number of pole pairs of the stator, the torque required, and the operating voltage range of the stepper motor, to name a few. Electrical current pulses are applied across to excite the winding 20 via a pair of leads 34 and 36 (see FIG. 5).

As indicated, the end portions of the arms 26 and 28 extending from the legs 22 and 24 through the core 18 are separated axially to form an air gap 30. In the preferred embodiment, the separation provides an axial air gap whose width and thickness of the rotor are related to various components of magnetic flux according to the magnetic stiffness and motor performance desired. Ordinarily, it would be desirable that the air gap have a width which, for manufacturing ease, is large. This, however, reduces the magnetic stiffness which should not be so low as to prevent efficient operation of the motor. Thus, the width of the air gap is controlled. The air gap permits the magnetic field generated by the stator to be directed onto the rotor perpendicular to the rotor plane and complementing this, the magnetic field generated by the rotor is directed to the stator pole faces perpendicular to the plane of the surface of the stator poles. This results in substantially less flux leakage and less reluctance to the magnetic field generated by the stator. Accordingly, the efficiency of the motor is materially improved.

The rotor is formed of a disc consisting of a low density material, such as barium ferrite in a rubber binder. This material is commonly sold under the tradename Plastiform, and a product of the 3M Company. The material is relatively inexpensive in the sizes required for rotor fabrication and has a residual induction value, i.e., retentivity of Plastiform, of 0.22 webers per meter squared. As illustrated in FIG. 1, rotor 38 is disposed between a pair of rotor discs 40 and 42 which support the rotor. Each rotor disc has a diameter which is less than the diameter of the rotor thereby to expose an outer annular portion of the rotor. The annular portion is permanently magnetized through the thickness of the rotor to form an annular magnetized area on both sides of the rotor. The magnetized area includes a plurality of equally spaced truncated triangular sections, each defining a pole of alternately opposed polarity. The dipole arrangement may be seen to best advantage in FIG. 3. The poles are positioned so that they are contiguous to one another about the outer annular portion of the rotor thereby rendering the entire annular portion available for generating alternately opposed magnetic fields.

The rotor 38 is fixed on a shaft 44 for rotation with respect to the stator. The shaft is supported at its ends by bearings 48 and 50. The bearing 50 is carried by the base plate 14 while the bearing 48 is supported by a plate 46 disposed below the top wall 12. To reduce friction between the shaft and the bearings, the shaft ends are swaged or otherwise reduced in diameter thereby to reduce the surface to surface contact between the shaft in each bearing. The base plate 14 and plate 46 also provide support for the opposed extending portions 22a and 24a of legs 22 and 24, respectively, received in openings 14a and 46a.

The gear train which is only generally illustrated includes a seconds gear 54 driven in stepwise fashion by the rotor 38. To this end, a rotor pinion 56 is press-fit or otherwise received by the shaft 44 for conjoint rotation with the rotor. As illustrated in FIG. 1, seconds gear 54 intermeshes with the rotor pinion for purposes as are well known. Each of the seconds gear 54, the minutes gear 58, and the hour gear 60 are supported by a main shaft 62 and driven by suitable gear reduction means (not shown). The hands of the clock or similar horological device (not shown) are mounted to the main shaft for rotation as is conventional. The rotor is driven at a rate of 7.5 rpm. If the rotor pinion is provided with eight teeth and the seconds gear is provided with 60 teeth the seconds gear will be driven at one rpm.

The motor is driven in a stepwise fashion by integrated circuit 52 having a pulsed current output, the frequency of which is determined by frequency of the source of oscillation and the number of counter stages. In the present embodiment, the integrated circuit has an alternating pulsed output of 2 pps. Each pulse is approximately 32 milliseconds in width and the pulses occur at approximately ½ second intervals.

For a clear understanding of the stepwise drive of the rotor and, consequently, the second hand connected through gear 54 and other structure as is conventional (and not shown) reference may be had to FIGS. 4A–F. These figures illustrate schematically the stator pole pieces of a pole pair (represented as "Pole #1" and "Pole #2"), comprising an arm and an extension to be described and the positioning of the rotor poles relative thereto at various times before, during and after a current pulse is applied across the energizing winding 20. As has been discussed and as will be demonstrated, the stepping motor is self-starting within at least the application of the second pulse across the energizing winding once power is connected to the integrated circuit 52. And, as also discussed and to be demonstrated, the stepping motor is unidirectional in movement.

FIG. 4A illustrates the position of the rotor poles relative to the stator poles before a pulse is applied across the energizing winding 20. In the figure, the rotor poles have assumed a quiescent magnetic detent position relative to the stator poles. In the present invention, the magnetic detent position of the rotor is obtained by the use of extensions 64 and 66 which enlarge the area of the pole faces of the arms 26 and 28 in the vicinity of the air gap 30 (see FIGS. 2, 2A and 2B). As illustrated in FIGS. 2A and 2B, the extensions 64 and 66 are carried on opposite sides of the arms 26 and 28 and are disposed in a stepped or skewed manner on the arms. Thus, the extension 66 extends beyond the end of arm 28, while the extension 64 is recessed relative to the end of the end of arm 26, a like distance. The extensions enhance conduction of the magnetic field passing from one stator pole through the rotor to the opposite stator pole and when the winding is not energized the rotor will be influenced angularly toward the smaller gap as in FIG. 4A wherein the magnetic pole is offset slightly to the right from a position directly between the stator poles. The rotor will move in a direction such that the magnetic poles leave from the smaller air gap. For the same purpose, the extensions also may be secured on the same sides of the arms 26 and 28, in a direction parallel to the plane of the rotor 38 and spaced relative to the air gap to determine the direction of angular movement of the rotor. To this end, one arm, such as arm 28 would be offset to the plane of the arm 26. This arrangement of stator poles may be considered a symmetrical arrangement across the air gap 30 and, as in the asymmetrical arrangement, the rotor will leave from the closer aligned portions defining the small air gap. The former arrangement or asymmetrical arrangement across the air gap 30, however, is preferred. With the magnetic fields so directed, a portion of the magnetic field passes through the next succeeding magnetic segment of the rotor thereby substantially obviating the possibility at start-up that the rotor will become locked. The extensions 64 and 66 will conform in size and shape to that of the arms and may be secured to the arms by any means providing good magnetic coupling, such as by welding. In the preferred embodiment, the extensions 64 and 66 are rectangular in shape, have a width and length substantially equal to the width and length of each of the arms 26 and 28 (see FIG. 2B). For further details as to the function achieved by the extensions and a further description of the pole piece with plural pole faces, attention is directed to U.S. Pat. No. 3,869,627, assigned to the present assignee, which disclosure is incorporated herein by reference.

Figure 4B:
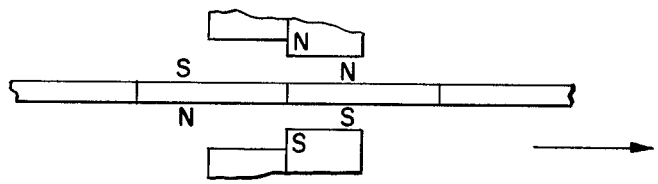
Figure 4C:
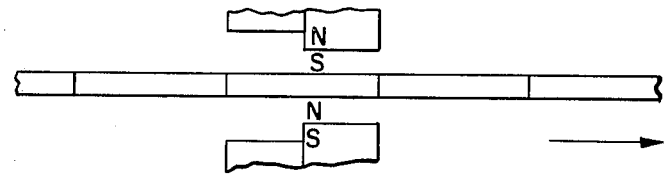
Figure 4D:
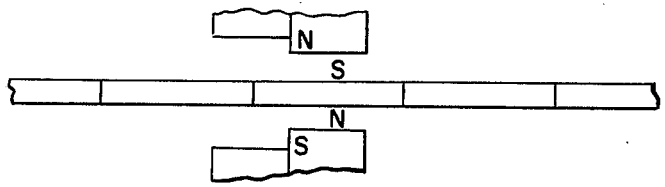
Figure 4E:
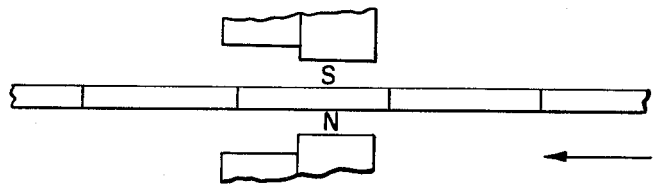
Figure 4F:
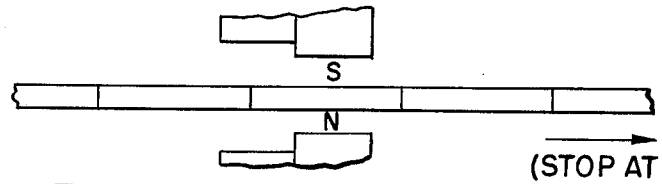

At start-up, before a first pulse is applied across the energizing winding 20, the rotor 38, as already described, resides in the quiescent magnetic detent position. If, for example, the first pulse induces a south (S) magnetic pole in "Pole #1" (hereinafter the "upper pole") and a north (N) magnetic pole in "Pole #2" (hereinafter the "lower pole"), the labelled dipole section of rotor 38 will move toward the left (directions are the directions in the figures) through the angle of approximately 5°. The rotor will be held by the magnetic attraction between the pole faces of the rotor and stator throughout the duration of the first pulse, i.e., for a period of about 32 ms. At the end of the first pulse, the rotor 38 is released by the drive and the restoring torque due to the rotor flux aligning with the stator poles returns the rotor 38 to the position in FIG. 4A. The next pulse and those that follow at approximately ½ second intervals results in unidirectional rotation of the rotor 38 through an increment of angular movement. It is possible that the rotor will move first slightly to the left (FIG. 4A) upon energization of the winding by the first current pulse after insertion of the battery. Specifically, the next pulse reverses the polarity of the stator poles so that the upper pole has a (N) polarity and the lower pole has a (S) polarity as illustrated in FIG. 4B. As the current rises within the energizing coil, it reaches a value that overcomes the "built-in" magnetic detent torque and inertia thereby to start to drive the rotor 38 to the right in the drawing. The low density of the rotor reduces friction and inertia. The magnetic stiffness can be adjusted by varying the width of the air gap 30. FIG. 4B illustrates the induced magnetic field at the stator poles attracting and repelling the rotor poles into and out of the air gap 30. FIG. 4C illustrates the zero drive torque position. The rotor 38, however, because of its angular momentum and the direction of the detent torque continues to move to the right toward the position of FIG. 4D. As the rotor 38 leaves the zero torque position, the drive current tends to magnetically brake the rotor so that with a maximum overshoot of from about 3° to about 5° beyond the magnetic detent position, the rotor comes to rest. At this time both the magnetic detent torque and the torque due to the coil current impart a leftward impetus to the rotor 38 (FIG. 4E) causing it in the reversal of movement to slightly overshoot the magnetic detent position. Approximately at this point of time the current within the energizing winding drops to zero and the rotor 38 positions itself (see FIG. 4F) in the magnetic detent position for the next pulse occurring approximately one-half second later in time. The next pulse reverses the polarity of the stator poles so that the upper pole is (S) and the lower pole is (N) and the rotor steps through a further step to the right in accordance with the above sequence. The next following pulse and each pulse thereafter causes the rotor to step through further steps to the right thereby to drive the gear train through the pinion 56 and the seconds gear 54. The minimum torque at the minute hand is approximately 0.6 ounch inches at 2.2 volts (210μω of motor power supplied).

FIGS. 4A-4F are schematic in nature. Therefore, the stator poles at the air gap may be configured as shown in FIG. 2B, i.e., in asymmetrical arrangement with the right side of "Pole #1" and "Pole #2" within the smaller gap formed by arm 26 and extension 66. The stator poles may be symmetrical, also, as heretofore set out.

Figure 5:
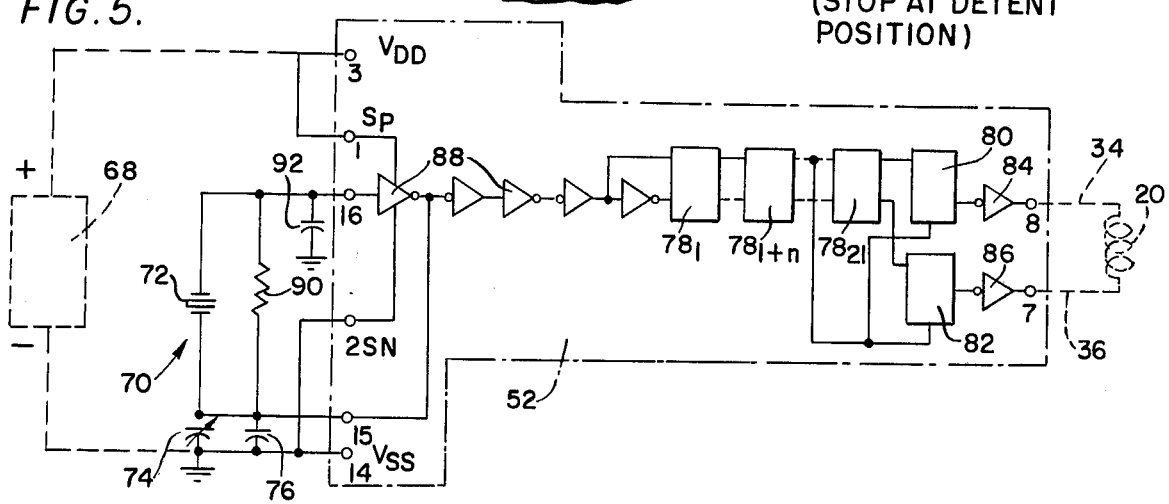
FIG. 5 is a block and schematic diagram of the circuitry for developing a series of pulses for application to the energizing winding of the stator.

Turning to FIG. 5, the figure illustrates the circuitry and power source for the stepping motor of the present invention. The power may derive from any convenient source of direct current such as a battery 68, which may be a conventional "C" type power cell. The integrated circuit has a very low power consumption and it has been found that both the integrated circuit and the oscillator operate satisfactorily with a source voltage of at least 1 v D.C. but, preferably, 1.5 v D.C. With the latter voltage the integrated circuit draws about 40μa (60 82 ω); whereas, the stepping motor draws about 300μa (450μω) and has a minimum requirement of running power of about 130μω. Because of the low power consumption, a 1.5 volt standard battery system will provide satisfactory operating results throughout a period of operation of at least 12 months.

The quartz crystal 72 is designed to oscillate at a frequency of 2.097152 MHz. The resonant frequency of the crystal may be controlled for clock accuracy of ±½ second per day by the adjustable trimming capacitor 74 connected between the crystal and ground.

The integrated circuit is a COS/MOS timing circuit including twenty one serially connected counter stages $78_1, 78_{1+n} \ldots 78_{21}$ in the form of a flip flop, a pair of output-shaping flip flops 80, 82 for shaping the output waveform for a 3.125% duty cycle, a pair of inverter output drivers 84, 86 provide push-pull operation.

The digital integrated circuit may be an RCA Developmental Type TA 6152 W timing circuit, identified in the RCA Solid State Division disclosure, dated January, 1974. The circuit is supplied in a 16 lead-in-line ceramic package and may be operated over a 1.1 to 6 v supply voltage range. Whereas, in most other COS/MOS 16-lead devices finding the power supply terminals as 16 and 8; in the present device the terminals $V_{DD}$ and $V_{SS}$ are terminals 3 and 14, respectively. As illustrated, the terminals 3 and 14 are shorted to their respective substrates $S_P$ and $S_N$ terminals 1 and 2, respectively. The terminals 4-6 and 9-13 have no connection and are not illustrated in the figure. The terminals 7 and 8 are connected to appropriate sides of the energizing coil 20. The terminal 16 is connected to the output of the oscillator circuit 70, while terminal 15 is connected to the output of amplifier 88 and provides feedback for the oscillator circuit 70. The numerals 1, 2 ... 16 which refer to terminals of the integrated circuit should not be confused with the numeral denoting structure heretofore identified.

In operation, the integrated circuit provides an output of 2 pps, each pulse having a duty cycle of about 32 ms and occurring at spaced intervals of about one-half a second.

In the arrangement of the oscillator circuit 70, the capacitors 76 and 92 couple the input and the output of amplifier 88 to a reference potential and the resistor 90 between the input and output biases the amplifier in its active state to initiate oscillation of the oscillator 70. The oscillator circuit as well as the integrated circuit may be conveniently supported by a printed circuit board which, in turn, is supported within casing 10 on base plate 14.

Without any intent to limit the present invention whose scope is determined by the claims herein, in the preferred embodiment the values of the components of the oscillator may be as follows:

| Component | Value |
|---|---|
| Capacitor 74 | 24 pF |
| Capacitor 76 | 12 pF |
| Resistor 90 | 2.2 M |
| Capacitor 92 | 12 pF |

The voltage of the source may be 3 v D.C. The rotor of the stepping motor may include 16 poles permanently magnetized dipole sections and may have a thickness of about 0.022 inches. The diameter of the rotor may be about 0.720 inches and the magnetized section along the radius is about 0.125 inches. The energizing winding of the stator, for 3 v D.C. operation, may be comprised of 8,000 turns of 42 gauge copper wire having a total resistance of approximately 860 ohms. The energizing winding may be comprised of 4,000 to 5,000 turns of 41 gauge copper wire for 1.5 volt operation. The air gap (A) through which the rotor rotates is no less than 0.039 inches in width and the stepping or skewing (B) of the extensions may be 0.005 ± 0.002 inches from the ends of the stator arms. The dimensions are illustrated in FIG. 2B.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended thereto.

Having described the invention, what is claimed is:

1. A unidirectional, self-starting stepping motor comprising:
   (a) a rotor having a series of permanently magnetized poles of alternating polarity disposed around an axis of rotation of said rotor;

(b) a stator including a core and an energizing winding, said core having at least one pair of pole pieces providing a pole pair having an air gap through which said magnetic poles are arranged to pass when said rotor is rotating therebetween, said energizing winding being coupled to said stator core and adapted for connection to a current source for developing an energizing flux field across said air gap between said pole pieces; and, (c) supplemental flux conducting means including projecting members extending from respective pole pieces in a plane parallel to the plane of rotation of said rotor, each said projecting member being mounted on one of said pole pieces to increase, parallel to the line of movement of said magnetized poles, the pole face area of said pole piece bounding said air gap with each said projecting member being disposed in alignment, across said air gap, with one of an opposed pole piece and a projecting member, and each said projecting member being arranged, also, so that aligned portions of said pole face area are disposed closer toward said plane of rotation of said rotor than the other aligned portions so that the closer aligned portions attractively influence each of said magnetized poles, when in said air gap, during operation.

2. The stepping motor of claim 1 wherein said poles pieces of each said pole pair and said projecting members are in mutual alignment.

3. The stepping motor of claim 1 wherein said pole pieces of each said pole pair and said projecting members define an axial air gap.

4. The stepping motor of claim 1 wherein said pole pieces of each said pole pair are in alignment with a respective one of said projecting members.

5. The stepping motor of claim 1 wherein said rotor has a pair of major faces, said series of permanently magnetized poles of alternating polarity are formed on each face by dipole portions.

6. The stepping motor of claim 5 wherein said rotor is disc-shaped in outline and said series of poles are contiguous and arranged in an annulus around said axis.

7. The stepping motor of claim 6 wherein said rotor poles are magnetized axially between said major faces.

8. The stepping motor of claim 1 wherein said rotor moves unidirectionally toward said closer aligned portions.

9. The stepping motor of claim 1 wherein said rotor poles on each major face are symmetrical and formed by truncated triangles.

10. The stepping motor of claim 1 wherein said stator has only a single stator pole pair.

11. The stepping motor of claim 1 wherein said closer aligned portions define an axial air gap of at least 0.039 inch.

12. The stepping motor of claim 11 wherein said projecting members are offset on said pole pieces by about 0.005 inches.

13. The stepping motor of claim 2 wherein said pole pieces of each said pole pair comprise said closer aligned portions.

* * * * *